United States Patent [19]

Tyler et al.

[11] 4,330,328

[45] May 18, 1982

[54] PROCESS AND APPARATUS FOR MAKING A METAL ALLOY

[75] Inventors: Derek E. Tyler, Cheshire; Harvey P. Cheskis, North Haven; Louis P. Stone, Naugatuck; Michael J. Pryor, Woodbridge, all of Conn.

[73] Assignee: Olin Corporation, New Haven, Conn.

[21] Appl. No.: 200,361

[22] Filed: Oct. 24, 1980

[51] Int. Cl.³ .................... C22B 15/14; C22B 9/02
[52] U.S. Cl. .......................... 75/76; 210/773; 266/216; 266/227; 420/492
[58] Field of Search ............... 75/68 R, 76, 153, 93 R, 75/93 AD, 135; 210/282, 287, 773; 266/231, 227, 216

[56] References Cited

U.S. PATENT DOCUMENTS

| | | | |
|---|---|---|---|
| 2,307,512 | 11/1941 | Kelly | 75/76 |
| 2,863,558 | 12/1968 | Brondyke et al. | 210/69 |
| 3,216,821 | 11/1965 | Edwards et al. | 75/76 |
| 3,281,238 | 10/1966 | Bachowski et al. | 75/93 |
| 3,537,987 | 11/1970 | Copeland | 210/20 |
| 3,738,827 | 6/1973 | Pryor et al. | 75/76 |
| 3,768,999 | 10/1973 | Ohkubo et al. | 75/135 |
| 3,893,917 | 7/1975 | Pryor et al. | 210/69 |
| 3,947,363 | 3/1976 | Pryor et al. | 210/510 |
| 3,962,081 | 6/1976 | Yarwood et al. | 210/69 |
| 4,024,056 | 5/1977 | Yarwood et al. | 210/69 |
| 4,052,198 | 10/1977 | Yarwood et al. | 75/68 |
| 4,088,475 | 5/1978 | Tyler et al. | 75/76 |
| 4,092,153 | 5/1978 | Yarwood et al. | 75/68 |
| 4,165,235 | 8/1979 | Dantzig et al. | 75/93 E |
| 4,248,630 | 2/1981 | Balmuth | 75/135 |
| 4,277,281 | 7/1981 | Weber et al. | 75/76 X |

*Primary Examiner*—L. Dewayne Rutledge
*Assistant Examiner*—Alan E. Schiavelli
*Attorney, Agent, or Firm*—Barry L. Kelmachter; Howard M. Cohn; Paul Weinstein

[57] ABSTRACT

A process and apparatus for producing a copper metal or alloy wherein a first material is added to a molten metal, consisting essentially of copper preferably in a furnace. After the first material is added, the molten metal is passed through a filtration device to remove particulate matter from the molten metal and/or reduce the oxygen content of the molten metal. After filtration, a second material is added to the molten metal.

13 Claims, 5 Drawing Figures

PROCESS AND APPARATUS FOR MAKING A METAL ALLOY

This invention relates to a process and apparatus for producing a metal or alloy. The invention has to do with the addition of at least one material to a base metal or metal alloy while the base metal or metal alloy is in a molten state so that certain physical properties may be enhanced. In particular, at least one reactive element is being added to the base metal or metal alloy.

The addition of one or more materials to a base metal or metal alloy to produce a metal or an alloy with certain properties, i.e. high strength, ductility, bend ratio, etc., is known in the prior art. Most frequently, the base metal or metal alloy is heated to a molten state, and the addition of at least one material occurs in the furnace. The material added to the base metal or metal alloy can be an element, a compound, or an alloy. The material or materials may be added to form an alloy or to refine the base metal or metal alloy. For example, the added material or materials may degas, deoxidize, desulphurize, or dephosphorize the molten metal. Reactive elements may be added to the molten metal to provide combinations of high strength, high electrical conductivity, and other mechanical properties.

The addition of a material or materials to a molten metal or metal alloy can result in the entrainment of solids and gases in the molten metal. Particles of metallic oxides or carbides, as well as other metallic and non-metallic particulates, may be present in the molten metal or metal alloy. These inclusions are deleterious to the final cast metal product. They can cause poor finishing characteristics and can hamper processing of the final cast metal product. To remove these particulates from the molten metal, it is known in the prior art to employ various filtering techniques.

One filtering technique uses ceramic foam filters to remove particulate matter from the molten metal. Illustrative of such ceramic foam filters are U.S. Pat. Nos. 3,893,917, 3,947,363, 3,962,081, and 4,024,056.

A second approach known in the prior art and generally used in conjunction with aluminum melts is the use of bed-type filters. U.S. Pat. No. 2,863,558 discloses passing molten aluminum metal through a heated bed of coarse granules of anhydrous refractory material. The coarse granules are gravitationally held below the surface of the metal. While being directed primarily to molten aluminum metal, U.S. Pat. No. 2,863,558 does disclose that this type of filter has been found to be especially effective in the case of those which contain one or more of the elements magnesium, silicon, zinc, manganese and copper.

U.S. Pat. No. 3,281,238 discloses passing a molten aluminum metal through a submerged bed of carbonaceous material. The carbonaceous material floats in the aluminum and is held in place by a retainer plate. The carbonaceous material may consist of a layer of fine material and a layer of coarse material. In order to prevent the molten aluminum metal from freezing in the carbonaceous material, the carbonaceous material is preheated.

U.S. Pat. No. 3,537,987 discloses a filtering system utilizing a degassing system in an upstream compartment and a floating filter bed of carbon granules in a downstream compartment. The floating filter bed has a layer of finer carbon granules covered by a layer of coarse carbon granules. The floating filter bed is held in place by a perforated retaining plate.

A third approach has been to use in-line degassing and filtration of the molten metal. Illustrative of this approach are U.S. Pat. Nos. 4,052,198, 4,092,153, and 4,165,235. This approach utilizes a fluxing gas which is passed through a ceramic foam filter plate to contact the molten metal. Dissolved gases and non-metallic inclusions are thereby abstracted and removed from the melt. The fluxing gas is most often used to remove entrained hydrogen gas caused by the reaction of molten aluminum metal with moisture.

As previously stated, a material addition or additions may be made to a molten metal or metal alloy while the molten metal or metal alloy is in the furnace. This addition or additions may be made using a hopper, a shovel, or a ladle. It is also known in the prior art that an addition or additions can be made in powder wire form to the molten metal or metal alloy. U.S. Pat. No. 4,088,475 discloses a method for directly injecting reactive elements in powder form into molten copper or copper alloy base using a tube filled with powder and drawn to a fine diameter wire. This method prevents unwanted reactions and oxidation in the molten metal.

In accordance with this invention, a metal alloy having high strength and high electrical conductivity is produced by making a first addition of material to the base metal or metal alloy, passing the molten base metal or metal alloy through a filtering device to remove particulate matter from and/or to reduce oxygen content of the molten base metal or metal alloy after the first addition, and then making a second addition of material to the molten base metal or metal alloy after filtering.

Accordingly, it is an object of this invention to produce a metal alloy.

It is a further object of this invention to remove particulate matter from and/or reduce the oxygen content of the molten metal prior to making a material addition to the molten metal.

These and other objects will become more apparent from the following description and drawings.

Figure 1:
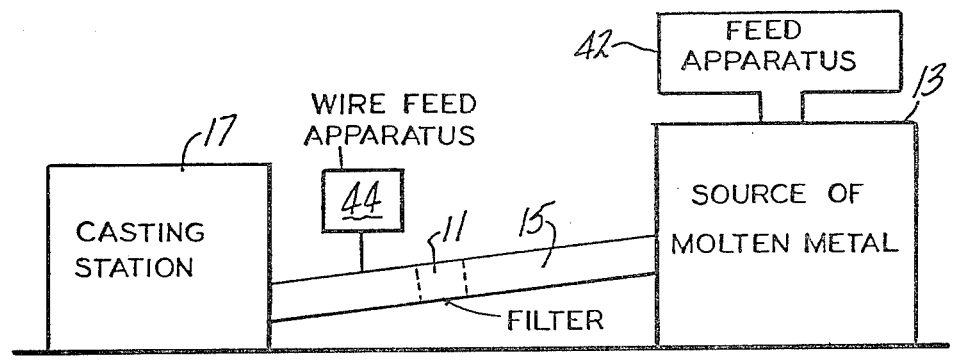
FIG. 1 is a schematic illustration of the casting system.
Figure 2:
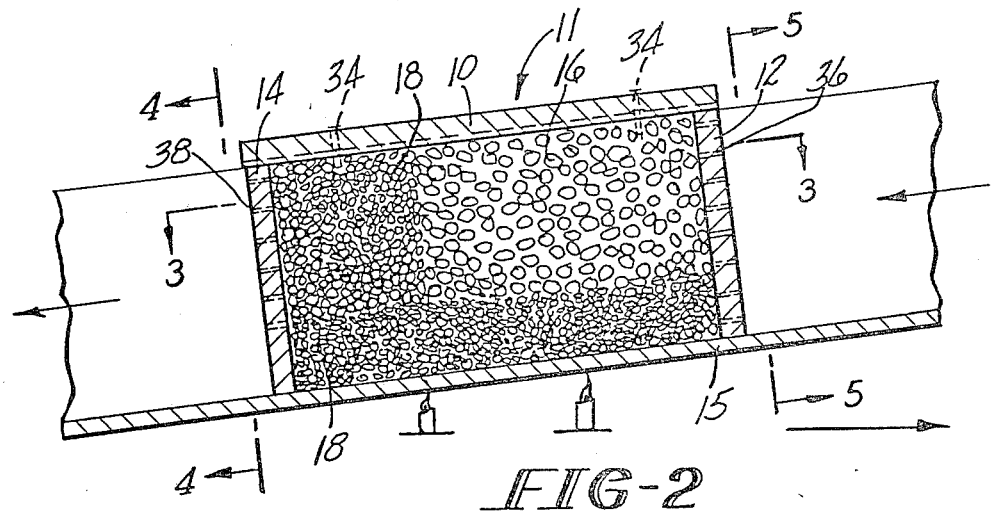
FIG. 2 is a side view of the transfer trough of FIG. 1.

In accordance with this invention, a process and apparatus for making a metal alloy is disclosed. The metal alloy in accordance with this invention is made by adding a first material to a base metal. As used in the following description, the word "material" includes an element, a compound, an alloy, a reactive element, or other desired material. As used in the following description, "base metal" includes a base metal element or metal alloy. In a preferred mode, the first material is added to the base metal after the base metal has been heated to a molten state. The first material is added to react with oxygen in the molten metal to form oxides which may then be filtered. Alternatively, the first material can be added to the base metal prior to heating the base metal to a molten state. After the addition of this first material, the molten metal is passed through a filtering device. The filtering device may remove particulate matter from and/or reduce the oxygen content of the molten metal. After filtering, a second material is added to the molten metal. This second material is used to produce the desired physical properties in the final metal alloy.

In the preferred mode, it is desirable that the first material addition does not cause the formation of particulates which may clog the filtering device and does not attack the filter itself. The first material addition should also have a minimal effect on the electrical conductivity of the final metal alloy. It is also desirable in the preferred mode to reduce the oxygen content of the molten metal so that the second material addition may be a reactive element addition which dissolves into the molten metal, thereby enhancing the physical properties of the metal alloy.

Referring now to FIGS. 1–5, there is shown in accordance with a preferred embodiment, a schematic of a casting system. The source of molten metal 13 can be a holding furnace. The first material addition is preferably made in the furnace. This material addition is made by feed apparatus 42 which can be a hopper, a ladle, a shovel, a conveyor, or any other mechanism suitable for adding material to a molten metal source. The base metal with the first material addition is heated and the resulting melt is passed through filtering device 11. In the preferred embodiment, filtering device 11 is located within transfer trough 15.

After the melt has passed through the filtering device 11, a second material addition is made to the melt. In the preferred embodiment, the second addition is made by using a wire feed apparatus 44 such as that disclosed in U.S. Pat. No. 4,088,475, hereby incorporated by reference.

In a first mode of operation, the filtering device 11 could be a ceramic foam filter such as one of those disclosed in U.S. Pat. Nos. 3,893,917, 3,947,363, 3,962,081, and 4,024,056, hereby incorporated by reference.

However, in the preferred mode of operation, the filtering device 11 is a disposable bed filter as described in U.S. patent application Ser. No. 200,342 to Pryor filed on an even date herewith. The bed filter 11 is located within a substantially flat-bottomed trough 15 communicating with the source of molten metal 13 and the casting station 17. The preferred embodiment shows the transfer trough 15 as being slightly inclined. However, the transfer trough 15 may be level. Also, in the preferred embodiment, the transfer trough 15 is substantially U-shaped in cross-section. The flow of the melt from the source of molten metal 13 to the casting station 17 is in a unidirectional, substantially horizontal, and substantially linear fashion. The term horizontal being used to include that which is more horizontal than vertical.

In the preferred embodiment, the bed filter 11 has bed media comprising a loose pack of granular materials located between an entry baffle plate 12 and an exit baffle plate 14. The bed filter 11 is preferably stratified so as to contain bed media of graded size. In the preferred embodiment, the portion 16 of the bed filter 11 is packed with coarse bed media. The coarse bed media has a general size range of from approximately three-quarters of an inch in diameter to approximately two inches in diameter. The coarse bed media serves to provide removal of larger particulates, i.e. the more massive oxide clusters. The portion 18 of the bed filter 11 is packed with fine bed media. The fine bed media has a general size range from approximately one-quarter to three-quarters of an inch in diameter. In the preferred embodiment, the fine bed media ranges in size from one-half to three-quarters of an inch in diameter. The fine bed media preferably extends the entire length of the bed filter 11 and preferably has a depth of about one-quarter to one-third of the depth of the transfer trough 15. In a preferred embodiment, the fine bed media in the terminal portion of the bed filter 11 approximately one-quarter to one-half of the length of the distance between the entry baffle plate 12 and the exit baffle plate 14 as measured from exit baffle plate 14, has a depth substantially equal to the depth of the bed filter 11. The fine bed media 18 serves to remove the smaller particles and to minimize the tendency for channelling. Channelling being the creation of a preferred path of flow for the melt. By minimizing the tendency for channelling, substantially the entire bed filter cross-section becomes active from a filtration standpoint.

The entry baffle plate 12 and the exit baffle plate 14 are both constructed in the preferred embodiment from perforated ceramic plate. It follows that the perforations in the baffle plates 12 and 14 should be small enough so as to prevent expulsion of the various bed media. The perforations 36 in entry plate 12 are substantially distributed throughout and have an area greater than approximately 30% of the cross-sectional area of the transfer trough 15. In the preferred embodiment, the perforations 36 are distributed uniformly and have an area in the range of about 50–60% of the trough cross-sectional area. The perforations 38 in exit plate 14 are substantially located in the upper two-thirds of the plate height. Preferably, the perforations 38 are located in the upper-half of the plate 14. By placing the perforations 38 in the upper portion of plate 14, the metal flows substantially through the entire cross-sectional area of the bed media and channelling at the bottom of the bed media can be avoided. The perforations 38 in exit plate 14 should also have an area greater than approximately 30% of the cross-sectional area of the transfer trough 15, preferably in the range of about 50–60% of the trough cross-sectional area.

Figure 3:
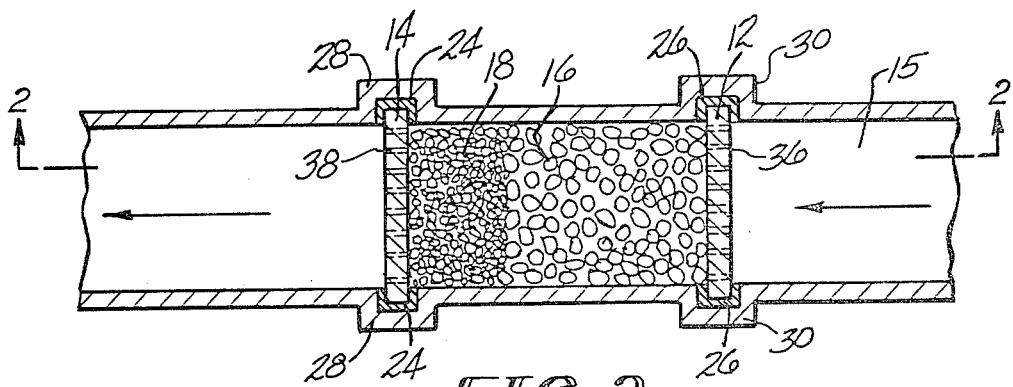
FIG. 3 is a sectional view of the apparatus along lines 3—3 of FIG. 2.
Figure 4:
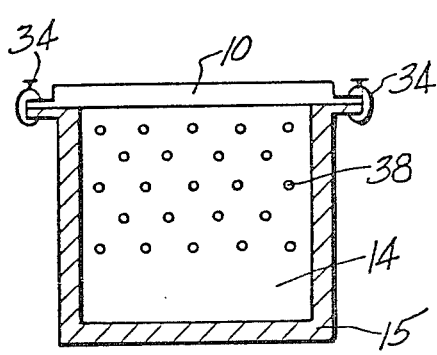
FIG. 4 is an end view of the rear portion of the filter system along lines 4—4 of FIG. 2.
Figure 5:
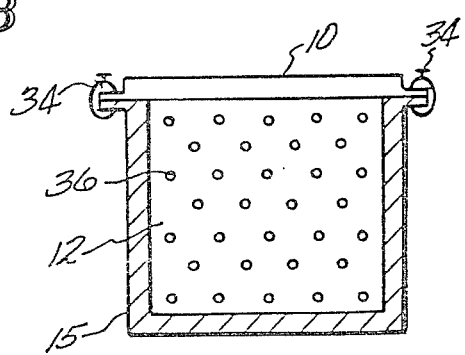
FIG. 5 is an end view of the front portion of the filter system along lines 5—5 of FIG. 2.

As best shown in FIG. 3, plates 12 and 14 are inserted into notches or grooves, 28 and 30, respectively. These notches or grooves 28 and 30 are formed in the trough sidewalls. The notches or grooves 28 and 30 have a width slightly larger than the plate widths. A packing 24 and 26 is inserted between the edges of the plates 12 and 14 and the notches 28 and 30 to hold the plates in place. The packing 24 and 26 is preferably made of a cloth-type or wool-type material. The construction as shown makes removal of the plates easier.

Transfer trough 15 is also provided with a closeable, imperforate lid 10 which bears upon the filter bed media. The closeable lid serves two purposes. The first of these purposes is to provide access to the disposable bed filter media. The second of these purposes is to maintain the bed media in a fixed position. For example, in the preferred embodiment, the closeable, imperforate lid 10 compensates for the buoyancy effect that exists as a result of the bed media having a density less than the density of the copper melt. Conventional means, such as C-clamps 34, may be used to hold the closeable lid 10 in a closed position.

The filter bed apparatus is constructed by first inserting plates 12 and 14 into notches 28 and 30 and then inserting packing 24 and 26 between the plates and the notches. The loose pack bed media 16 and 18 are then manually inserted between the plates. The fine bed media 18 is first inserted in place and the remainder of the space between the plates is filled with the coarse bed media 16. Prior to placing the lid 10 in position, the filter material is preheated to a temperature close to the molten metal temperature. The preheating of the filter material is performed by conventional gas flames used to preheat the transfer trough 15.

After a cast has been terminated, it is intended that the bed media be removed. This is accomplished by removing the lid 10 and using standard means, such as a ladle, to run off the remaining molten metal. Once this has been done, the baffle plates 12 and 14 are removed and the bed media 16 and 18 are manually removed from the transfer trough, i.e. by using a ladle to remove the bed media.

In conjunction with the double addition process disclosed herein, the bed media could be a carbonaceous material of which coke would be a preferred example. The coke-type bed media has a dual mode of operation. This dual mode of operation comprises the removal of particulate matter, such as metallic oxides, together with simultaneous residual deoxidation of the melt.

In another process embodiment where a copper melt is prepared and a reactive element or elements are added to the copper melt ahead of the filter bed, the bed media may be refractory oxides that are not rapidly attacked by molten copper alloys. Examples would include balls or tablets of alumina, chromia, zirconia, etc.

In the preferred process embodiment, the base metal is copper or copper alloy. Preferably after the copper or copper alloy is heated to a molten state, a first material addition comprising a chromium material is made. The chromium material is preferably a master alloy containing five or ten percent chromium. The chromium reacts with the oxygen in the molten copper or copper alloy to form particles or chromium oxides which can then be filtered. A chromium material addition is highly desirable because it has a small effect on the electrical conductivity of the final metal alloy and because it does not attack the filter material. However, any suitable material, i.e. boron, may be added which reacts with the oxygen in the molten metal to form particulates and which does not attack the filter material.

The molten copper or copper alloy containing the chromium material is then preferably passed through a coke-type bed filter. The coke-type bed filter removes the particles of chromium oxide and other metallic and non-metallic particulates. The coke-type bed filter also residually deoxidizes the melt.

After filtration, a second material addition preferably comprising a zirconium material is made. The zirconium material is added to the melt preferably in powder form by wire-feed apparatus 44. The zirconium material dissolves in the melt and produces the desired physical properties of high strength and high electrical conductivity in the resultant alloy. It is important to reduce the oxygen content of the melt prior to the zirconium addition to prevent as much as possible the zirconium material from reacting with oxygen in the melt.

While, in the preferred embodiment, the process of this invention is used to make a copper alloy, the disclosed process can also be used to make alloys having other base metals, i.e. aluminum.

While, in the disclosed embodiments, the bed media comprises either a refractory oxide or a carbonaceous material, depending upon the molten metal, any suitable material or combination of materials may be used. Furthermore, while, in the preferred embodiment, the bed media is removed after each cast, the bed media may be used for several casts.

While, in the preferred embodiment, the process is a double addition process, the metal or alloy can be made using a process wherein a single material addition is made after the melt has been filtered and/or the oxygen content in the melt has been reduced.

While, in the preferred embodiment, the material additions comprise reactive elements, any suitable material additions to produce a metal or alloy can be made.

It is apparent that there has been provided in accordance with this invention a process and apparatus for making a metal alloy which fully satisfies the objects, means, and advantages set forth hereinbefore. While the invention has been described in combination with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A process for producing a copper metal or alloy from a source of molten metal consisting essentially of copper comprising:
   adding a first reactive material to said molten copper metal to react with oxygen in said molten copper metal to form oxide particles;
   providing a station for casting said molten copper metal and means for transferring said molten copper metal from said source to said casting station;
   filtering said molten copper metal passing through said transferring means to remove said oxide particles; and
   adding a second material which dissolves into said molten copper metal to said molten copper metal after the step of filtering and while said molten copper metal is still in said transferring means.

2. The process of claim 1 wherein the step of adding said first reactive material further comprises adding said first reactive material while said molten copper metal is in said source.

3. The process of claim 1 further comprising providing a feed means and wherein the step of adding said second material further comprises adding said second material by said feed means.

4. The process of claim 3 wherein the step of adding said second material further comprises adding a powdered material and wherein said feed means comprises a wire feed means.

5. The process of claim 1 wherein the step of adding said second material comprises adding a second reactive material to the molten copper metal.

6. The process of claim 1 wherein said first reactive material comprises chromium.

7. The process of claim 5 or 6 wherein said second material comprises zirconium.

8. An apparatus for producing a copper metal or alloy comprising:
   a source of molten metal consisting essentially of copper;
   a casting station;
   a transfer trough connecting said source and said casting station;

means for adding a first reactive material to said molten copper metal;

means for filtering said molten copper metal located in said transfer trough; after said first material has been added to said molten metal and means for adding a second material which dissolves into said molten copper metal to said molten copper metal while said molten copper metal is in said transfer trough and as soon as possible after said molten copper metal has passed through said filtering means.

9. The apparatus of claim 8 wherein said first reactive material adding means comprises means for adding said first reactive material to said source.

10. The apparatus of claim 8 wherein said filtering means comprises means for removing particulate matter from said molten copper metal.

11. The apparatus of claim 10 wherein said filtering means comprises ceramic foam filtering means.

12. The apparatus of claim 8 wherein said second material adding means comprises wire feed means.

13. The apparatus of claim 12 wherein said wire feed means adds said second material in powdered form.

* * * * *

UNITED STATES PATENT AND TRADEMARK OFFICE
CERTIFICATE OF CORRECTION

PATENT NO. : 4,330,328

DATED : May 18, 1982

INVENTOR(S) : Derek E. Tyler et al.

It is certified that error appears in the above—identified patent and that said Letters Patent is hereby corrected as shown below:

In Column 5, line 38, the word "or" should read ---of---.

In Column 7, line 4, delete the semicolon (;) following the word "trough";

In Column 7, line 5, insert a semicolon ---;--- following the word "metal".

Signed and Sealed this

Sixteenth Day of August 1983

[SEAL]

Attest:

GERALD J. MOSSINGHOFF

Attesting Officer    Commissioner of Patents and Trademarks